United States Patent
Zhou et al.

(10) Patent No.: US 11,046,242 B2
(45) Date of Patent: Jun. 29, 2021

(54) DISPLAY FOR REAR LAMP OF A VEHICLE

(71) Applicant: Ford Global Technologies, LLC, Dearborn, MI (US)

(72) Inventors: Roy Zhou, Dearborn, MI (US); Robert Miller, Dearborn, MI (US); Adrienne Kaueroff, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/484,566

(22) PCT Filed: Feb. 9, 2017

(86) PCT No.: PCT/US2017/017144
§ 371 (c)(1),
(2) Date: Aug. 8, 2019

(87) PCT Pub. No.: WO2018/147854
PCT Pub. Date: Aug. 16, 2018

(65) Prior Publication Data
US 2019/0366918 A1 Dec. 5, 2019

(51) Int. Cl.
| | |
|---|---|
| *G08B 21/00* | (2006.01) |
| *B60Q 1/52* | (2006.01) |
| *B60Q 1/00* | (2006.01) |
| *B60Q 1/30* | (2006.01) |
| *B60Q 1/34* | (2006.01) |
| *B60Q 1/50* | (2006.01) |
| *B60Q 1/54* | (2006.01) |

(Continued)

(52) U.S. Cl.
CPC .......... *B60Q 1/525* (2013.01); *B60Q 1/0023* (2013.01); *B60Q 1/30* (2013.01); *B60Q 1/34* (2013.01); *B60Q 1/503* (2013.01); *B60Q 1/54* (2013.01); *F21S 43/26* (2018.01); *F21S 43/31* (2018.01)

(58) Field of Classification Search
CPC .......... B60Q 1/0023; B60Q 1/30; B60Q 1/34; B60Q 1/503; B60Q 1/525; B60Q 1/54; F21S 43/31; F21S 43/26
USPC ........................................ 340/435
See application file for complete search history.

(56) References Cited

U.S. PATENT DOCUMENTS

| | | | |
|---|---|---|---|
| 7,378,948 B2 * | 5/2008 | Somuah ................ | B60Q 1/503 180/167 |
| 8,686,872 B2 * | 4/2014 | Szczerba ................ | G02B 27/01 340/905 |

(Continued)

*Primary Examiner* — Mark S Rushing
(74) *Attorney, Agent, or Firm* — Brandon Hicks; Eversheds Sutherland (US) LLP

(57) ABSTRACT

A vehicle includes a rear lamp display configured to display images as well as perform the usual functions of a rear lamp assembly. The rear lamp display may include a light source and a digital mirror device. Obstacles detected may trigger display of a static or animated representation of the obstacle in the rear lamp display. Detection of a turn may invoke display of a direction of the turn as well as text indicating a target of the turn. Detection of an intervention of a vehicle system to maintain stability, a warning may be displayed that indicates potentially hazardous road conditions. Where opening of a door is detected, a representation of an open or opening door may be displayed. Where a following vehicle is detected, the speed limit or cruising speed of the vehicle may be displayed. Objects left in the vehicle may trigger display of an alert.

16 Claims, 9 Drawing Sheets

(51) Int. Cl.
*F21S 43/31* (2018.01)
*F21S 43/20* (2018.01)

(56) References Cited

U.S. PATENT DOCUMENTS

| | | | |
|---|---|---|---|
| 9,110,471 B2* | 8/2015 | Pack | G05D 1/0214 |
| 2009/0225234 A1* | 9/2009 | Ward | G09G 3/3426 |
| | | | 348/744 |
| 2010/0025131 A1* | 2/2010 | Gloceri | B62D 21/11 |
| | | | 180/65.28 |
| 2010/0134264 A1* | 6/2010 | Nagamine | B60Q 9/005 |
| | | | 340/435 |
| 2013/0076059 A1* | 3/2013 | Zalan | E05C 19/166 |
| | | | 296/97.22 |
| 2014/0184400 A1* | 7/2014 | Yang | G08G 1/166 |
| | | | 340/435 |
| 2016/0288644 A1* | 10/2016 | Bochenek | G02B 27/01 |
| 2017/0190286 A1* | 7/2017 | Yavitz | B60Q 1/54 |

* cited by examiner

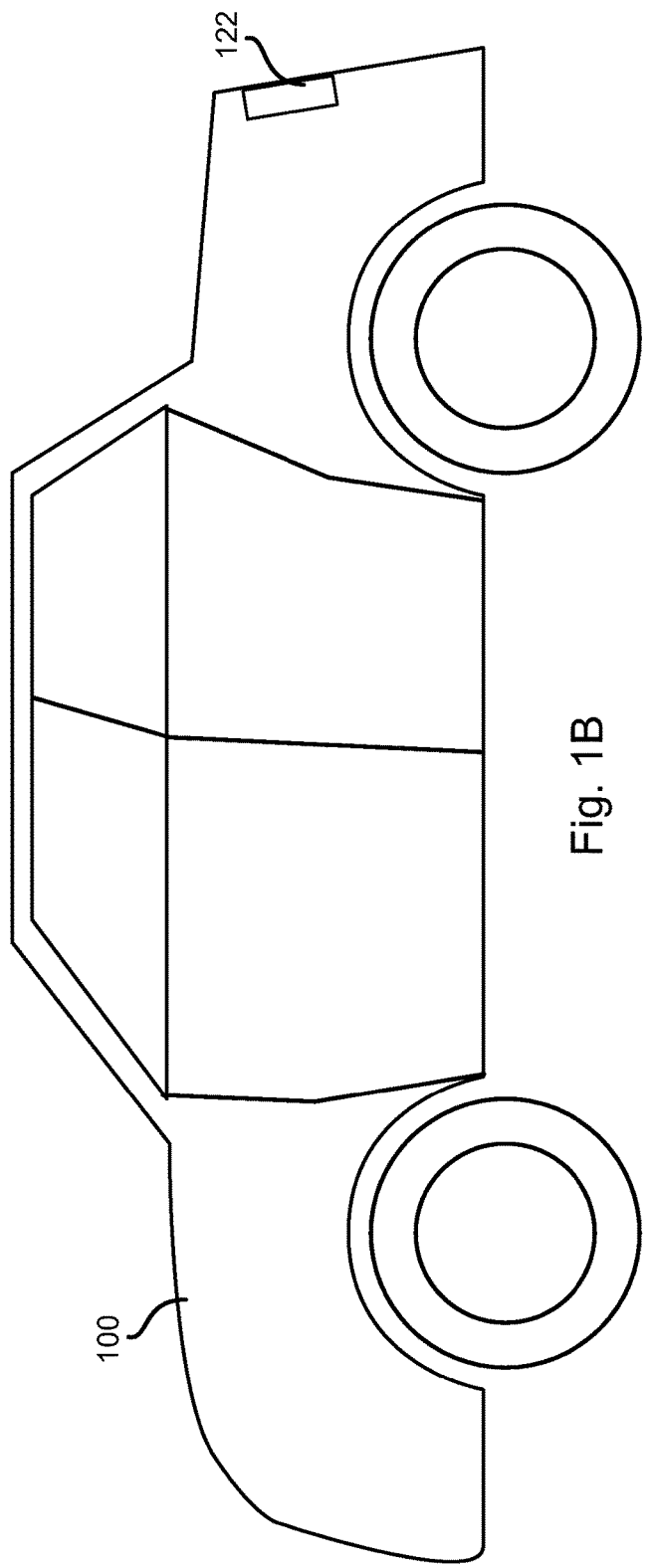
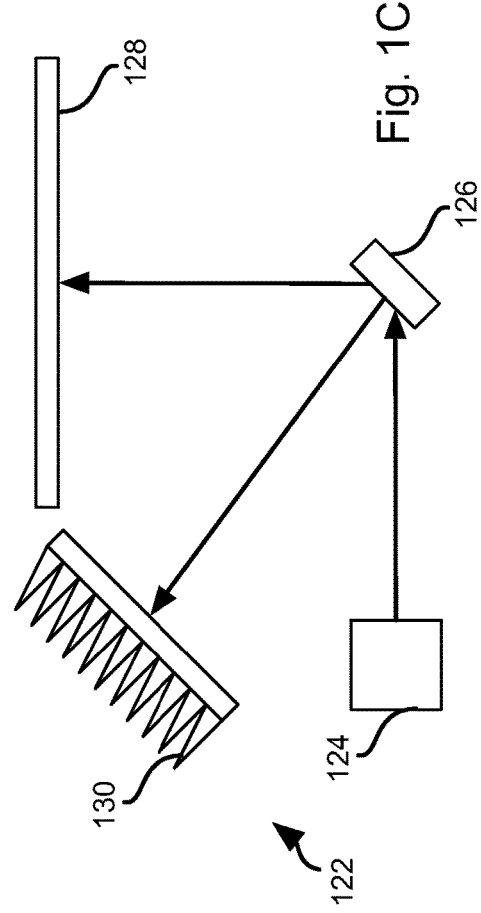
Fig. 1B
Fig. 1C

DISPLAY FOR REAR LAMP OF A VEHICLE

BACKGROUND

Field of the Invention

This invention relates to signaling to other drivers using a vehicle.

Background of the Invention

In current vehicles, a rear lamp assembly typically includes a position lamp, stop lamp, turn indicator, and reverse lamp. The position lamp shows an outline of the vehicle with low intensity red light emitted from the assembly. The stop lamp shows an intent to stop when the vehicle brake pedal is pushed with higher intensity red light emitted than the position lamp. The turn indicator provides amber or red flash in response to a driver activating it. The reverse lamp provides a white illumination light source when the vehicle is reversing.

The system and methods disclosed herein provide an improved functionality for a rear lamp assembly.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 1B is a schematic block diagram of a vehicle suitable for implementing embodiments of the present invention;

FIG. 1C is a schematic diagram of a rear lamp display system in accordance with an embodiment of the present invention;

DETAILED DESCRIPTION

Figure 1A:
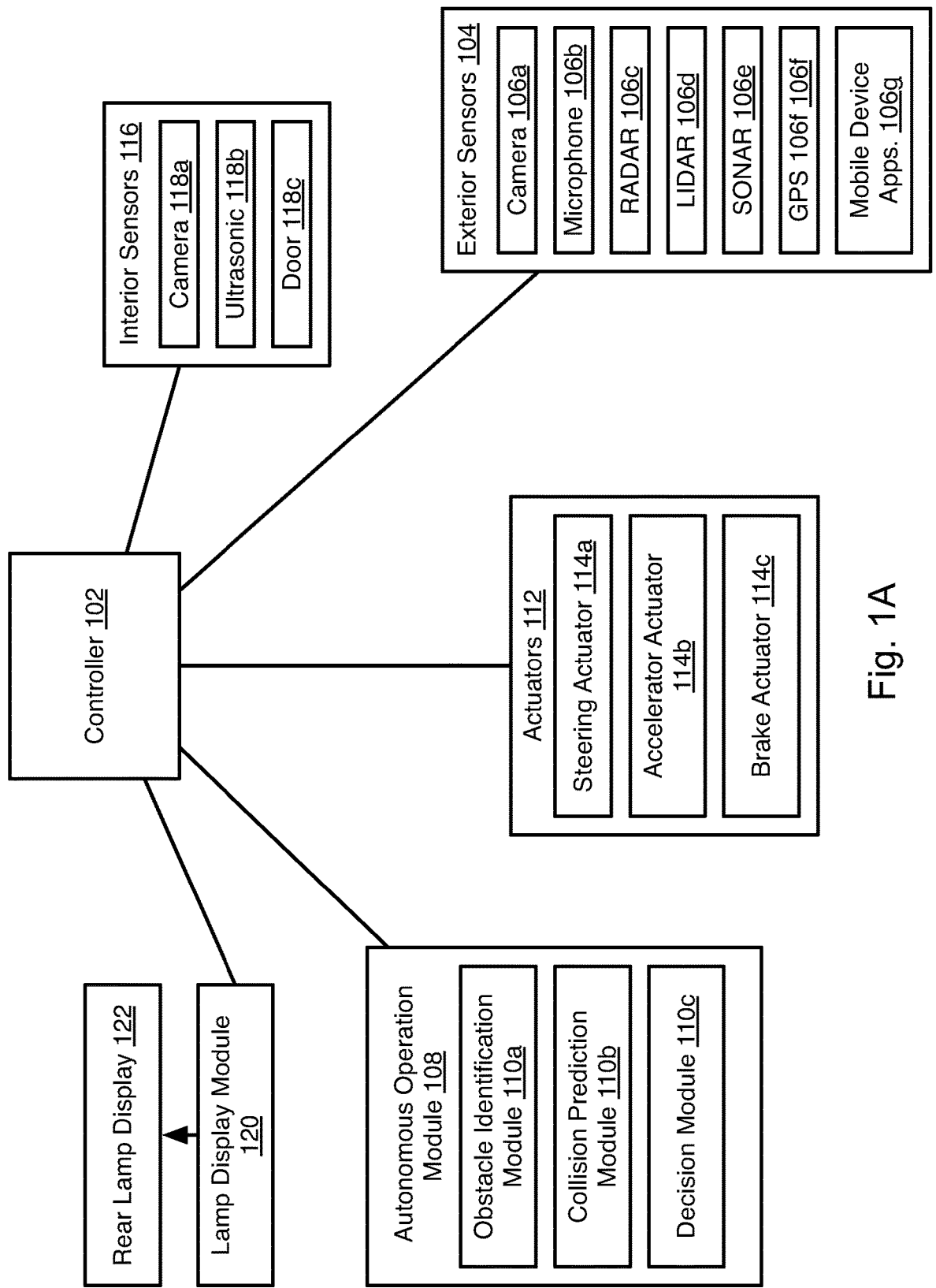
FIG. 1A is a schematic block diagram of a system for implementing embodiments of the invention.

Referring to FIGS. 1A and 1B, a vehicle 100 (see FIG. 1B) may house a controller 102. The vehicle 100 may include any vehicle known in the art. The vehicle 100 may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. The controller 102 may receive one or more outputs from one or more exterior sensors 104. For example, one or more cameras 106a may be mounted to the vehicle 100 and output image streams received to the controller 102. The controller 102 may receive one or more audio streams from one or more microphones 106b. For example, one or more microphones 106b or microphone arrays 106b may be mounted to the vehicle 100 and output audio streams to the controller 102. The microphones 106b may include directional microphones having a sensitivity that varies with angle.

The exterior sensors 104 may include sensors such as RADAR (Radio Detection and Ranging) 106c, LIDAR (Light Detection and Ranging) 106d, SONAR (Sound Navigation and Ranging) 106e, and the like.

The exterior sensors 104 may further global positioning system (GPS) receiver 106f for determining a location of the vehicle. Information may also be received by the controller from applications 106g executing on a mobile device of the user or an in-vehicle infotainment system.

The controller 102 may execute an autonomous operation module 108 that receives the outputs of the exterior sensors 104. The autonomous operation module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle 100 based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110*c* takes action to avoid potential collisions may be according to any method or system known in the art of autonomous vehicles.

The decision module 110*c* may control the trajectory of the vehicle by actuating one or more actuators 112 controlling the direction and speed of the vehicle 100. For example, the actuators 112 may include a steering actuator 114*a*, an accelerator actuator 114*b*, and a brake actuator 114*c*. The configuration of the actuators 114*a*-114*c* may be according to any implementation of such actuators known in the art of autonomous vehicles.

In embodiments disclosed herein, the autonomous operation module 108 may perform autonomous navigation to a specified location, autonomous parking, and other automated driving activities known in the art.

The vehicle 100 may include one or more interior sensors 116 coupled to the controller 102. The interior sensors may include a camera 118*a*, ultrasonic sensor 118*b*, door sensor 118*c*, or any other sensor for detecting a state of a vehicle or interior of a vehicle known in the art.

The controller 102 may further be coupled to a lamp display module 120, or implement a lamp display module 120. In particular, the lamp display module 120 may be a separate component programmed to performed the functions described herein or may be software or hardwired functionality of the controller 102.

The lamp display module 120 is coupled to a rear lamp display 122. As shown in FIG. 1B, the rear lamp display 122 may be positioned on the rear of the vehicle 100, such as in the typical position of the rear lamp assembly of a vehicle. The rear lamp display 122 may perform some or all of the functions of a rear lamp assembly, including those of the position lamp, stop lamp, turn indicator, and/or reverse lamp.

Referring to FIG. 1C, the rear lamp display 122 may include a light source 124. The light source may be a light emitting diode (LED), fluorescent lamp, incandescent lamp, halogen lamp, or any other light source known in the art. As described in greater detail below, the rear lamp display 122 may display images. Accordingly, the light source 124 may include one or more lenses for collimating light of the light source or otherwise focusing light of the light source 124.

In the illustrated embodiment, light from the light source 124 is projected onto a digital mirror device (DMD) 126. Alternatively, the light source 124 may project through an LCD screen. In still other embodiments, light source 124 may be a LED or laser projector such that a DMD 126 is not needed. The light source 124 and DMD 126 may be replaced with or implement any digital projector technology known in the art.

In the illustrated embodiment, light incident on the DMD 126 may be directed by the DMD 126 to either a window 128 or a heat sink 130. The window 128 may include transparent plastic. The plastic may be frosted or otherwise treated to scatter light incident thereon in order to form an image from light rays incident on the window 128 from the DMD 126. In some embodiments, a lens may be positioned between the DMD 126 and the window 128 in order to focus light from the DMD 126 onto the window 128 and form an image.

Light that is not directed by the DMD 126 to the window 128 may be directed at a heat sink 130. The heat sink 130 may be treated with a non-reflective film or texturing. The heat sink 130 may be made of a conductive metal such as steel, aluminum, brass, or other metal. The heat sink 130 may include fins to facilitate transfer of heat to surrounding air due to the energy of light incident on the heat sink 130. The heat sink 130 may include a fan, refrigeration system, or other structures to promote cooling.

Figure 2:
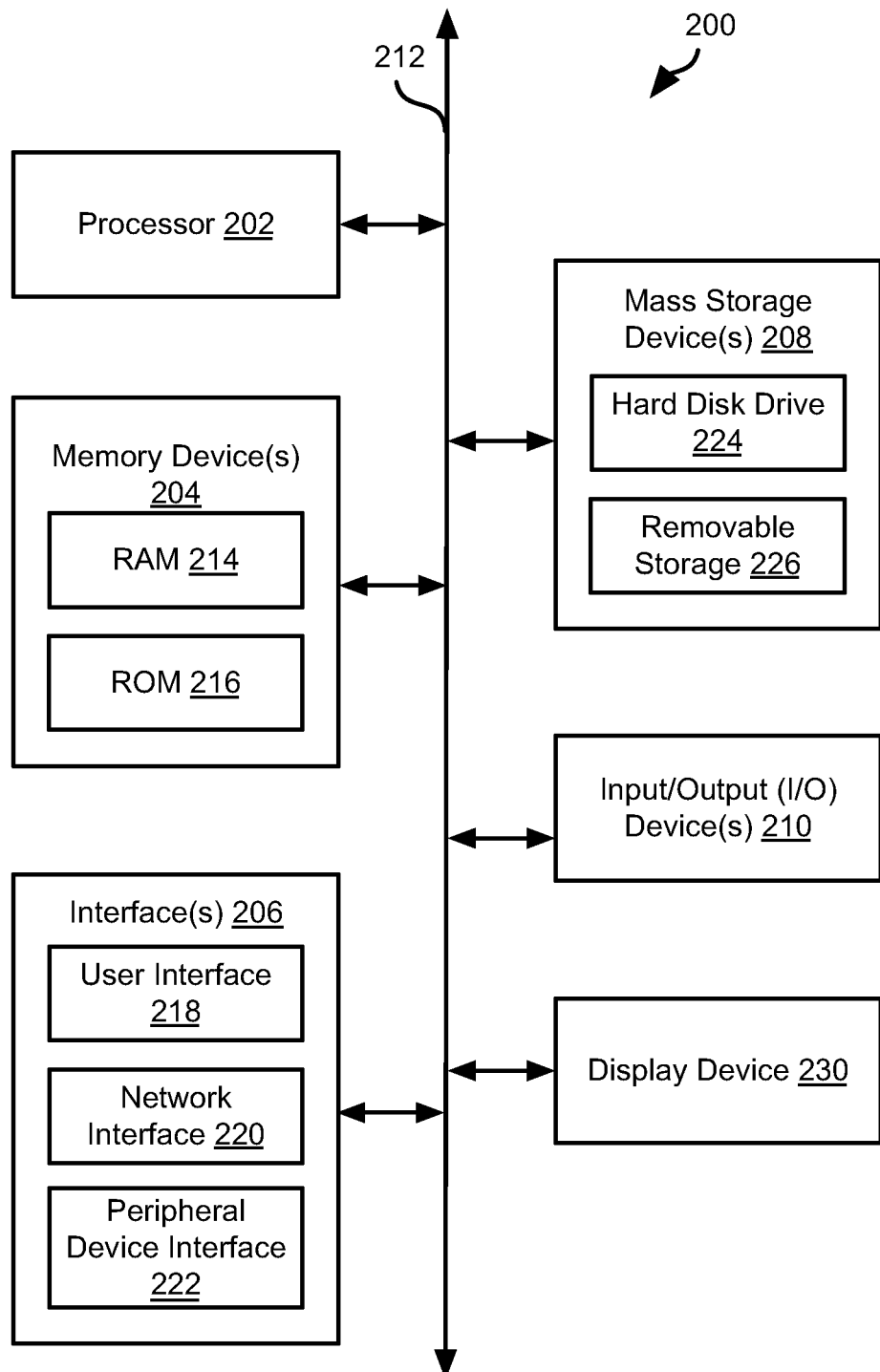
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200. Where the lamp display module 120 is a separate component, it may also have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3A:
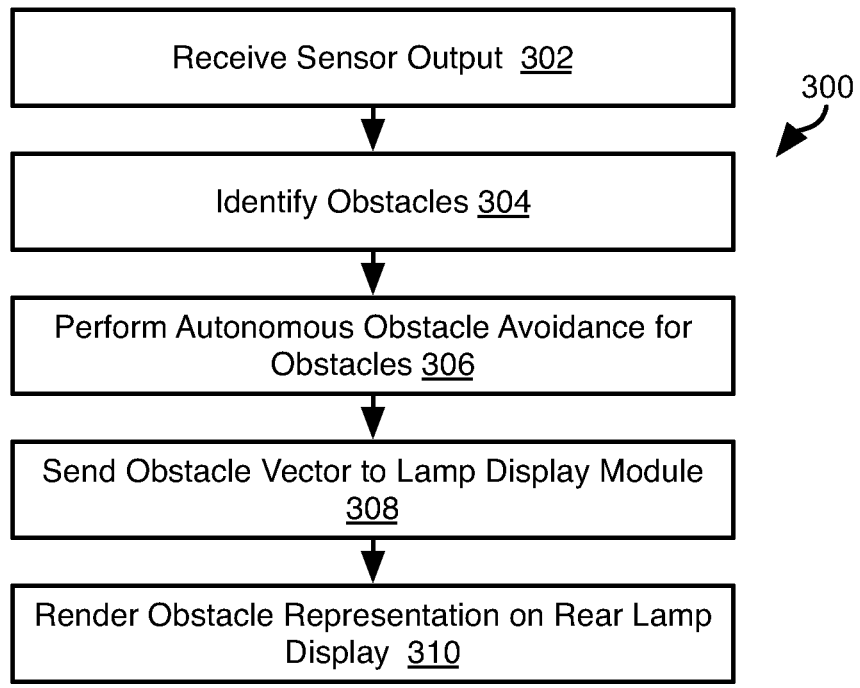
FIG. 3A is a process flow diagram of a method for communicating detected obstacles using a rear lamp display in accordance with an embodiment of the present invention.

Referring to FIG. 3A, the illustrated method 300 may be executed by the controller 102 and lamp display module 120. The method 300 may include receiving 302 sensor output, such as by receiving the outputs of one or more exterior sensors 104. The method 300 may include identifying 304 obstacles in the outputs of the one or more exterior sensors 104. Step 304 may include any technique for obstacle detection using electronic sensors known in the art.

The method 300 may further include performing 306 autonomous obstacle avoidance with respect to obstacles identified at step 304. This may include activating some or all of the actuators 112 in order to change the speed and/or trajectory of the vehicle 100. In some embodiments, the lamp display module 120 is include in a non-autonomous vehicle or in a vehicle that is not currently operating autonomously. Accordingly, step 306 may be omitted in such embodiments or be replaced with generation of a driver-perceptible alert.

The method 300 may further include sending 308 one or more obstacle vectors to the lamp display module 120. Each obstacle vector may include one or more items of information describing an obstacle detected at step 304. For example, the obstacle vector may include a classification of the obstacle (pedestrian, vehicle, cyclist, animal, etc.), a location, a direction of movement, or other information. The manner in which the obstacle is classified may include any classification technique known in the art of autonomous vehicle operation or electronic detection, e.g. RADAR, LIDAR, etc. As noted above, the lamp display module 120 may be implemented by the controller 102 or by a separate component.

Figure 3B:
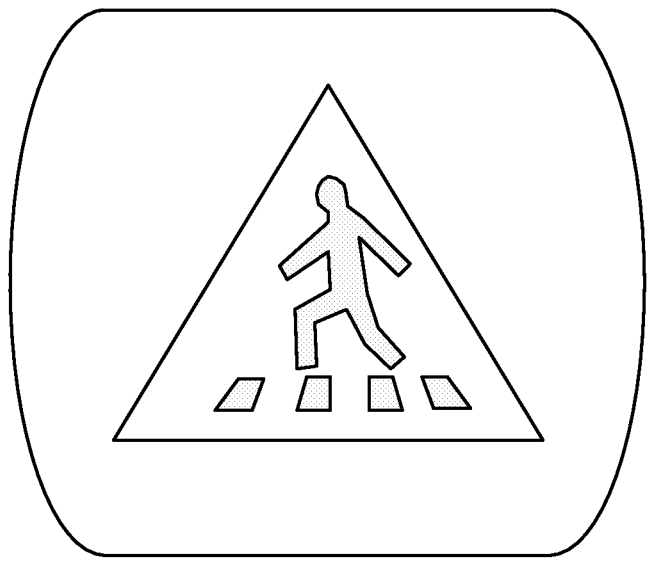
FIG. 3B is an example illustrating of a rear lamp communicating a detected obstacle in accordance with an embodiment of the present invention.

The lamp display module 120 may then render 310 a representation of some or all of the obstacle vectors in response to receiving the vectors. For example, as shown in FIG. 3B, where an obstacle is classified as a pedestrian, the illustrated image may be shown on the rear lamp display 122. In some embodiments, the image may be animated and show the pedestrian moving in a direction of movement indicated by the obstacle vector. In a similar manner, static or animated symbols representing a vehicle, animal, cyclist, may be displayed in correspondence with the classification indicated in the obstacle vector. Where multiple obstacles are simultaneously detected, multiple representations may be displayed simultaneously.

When implemented by the controller 102, step 308 may be omitted and the controller 102 may respond to detection of an obstacle by invoking rendering 310 of a symbol corresponding to the classification of the obstacle, possibly with animation corresponding to the direction of movement of the obstacle.

Figure 4A:
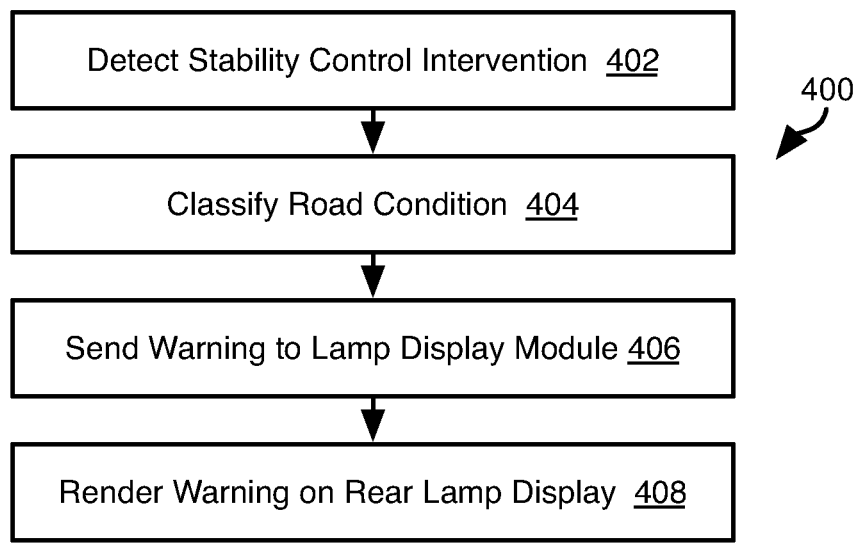
FIG. 4A is a process flow diagram of a method for communicating road conditions using a rear lamp display in accordance with an embodiment of the present invention.

Referring to FIG. 4A, in some embodiments, the rear lamp display 122 may be used to display warnings regarding hazardous road conditions. For example, a method 400 may be executed by the controller 102 and lamp display module 120. The method 400 may include detecting 402 a stability control intervention. This may include any automated action to maintain stability of the vehicle, such as actions that may be taken by an anti-lock braking system (ABS), electronic stability control (ESC), traction control system (TCS), or other system. The actions taken may include modulating braking force on one or more wheels, reducing power, controlling torque distribution among two or four wheels, or the like. Such actions may be taken based on outputs of various sensors known in the art of ABS, ESC, TCS, and the like, such as wheel speed sensors that detect slipping of one wheel, accelerometers that detect slipping or rolling, or the like. If an intervention is detected at step 402, then some or all of steps 404-408 may be performed.

In some embodiments, the method 400 may include classifying 404 a road condition that caused the intervention, e.g., wheel slip may indicate slippery roads, rolling may indicate a sharp turn, etc. The method 400 may include sending 406 a warning to the lamp display module 120 in response to detecting 402 the intervention. The lamp display module 120 may then render 408 a representation of the warning on the rear lamp display 122 in response to receiving the warning. Alternatively, step 406 may be omitted and step 408 may be performed by the controller 102 in response to the detection of step 402.

Figure 4B:
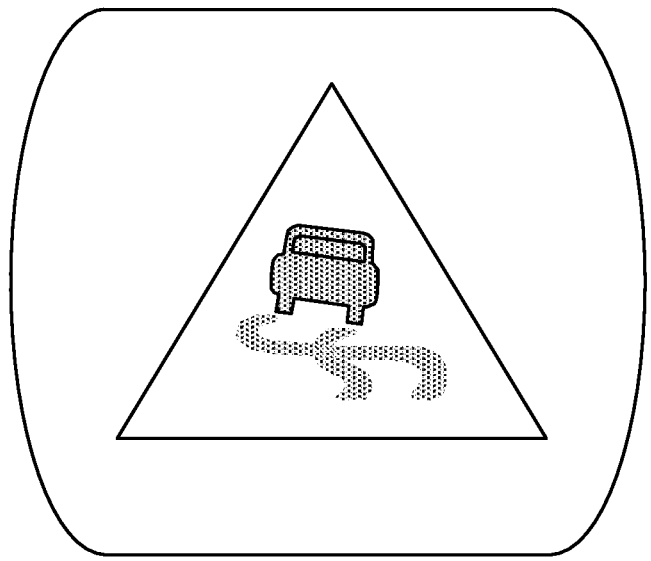
FIG. 4B is illustrates a rear lamp communicating a road condition in accordance with an embodiment of the present invention.

For example, as shown in FIG. 4B, where the intervention is caused by slipping of one or more wheels, the illustrated symbol may be shown to indicate that the road is slippery. Where a sharp turn is the cause of the intervention, then an image of a sharp turn may be shown. In some embodiments, warnings may be sent based on detected slipping or rolling in the absence of an intervention, i.e. where the slipping or rolling was insufficient to trigger an intervention but may still be of concern.

Figure 5A:
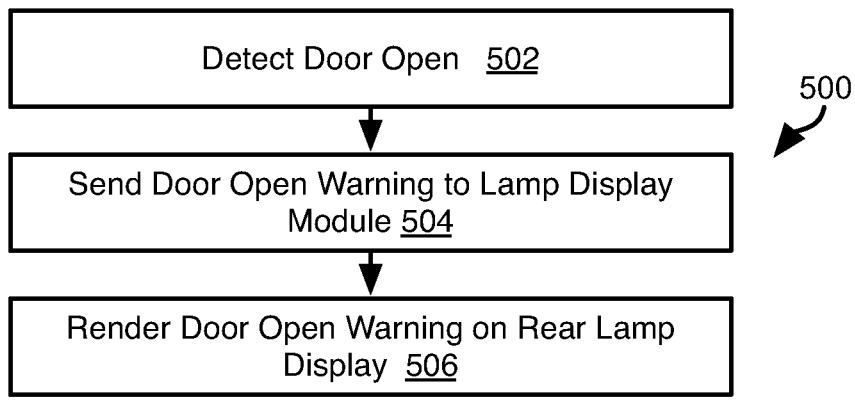
FIG. 5A is a process flow diagram of a method for communicating opening of a door using a rear lamp display in accordance with an embodiment of the present invention.

Referring to FIG. 5A, in some embodiments the illustrated method 500 may be executed by the controller 102 and lamp display module 120 in order to alert cyclist of a door opening. The method 500 may include detecting 502 opening of a door or an action that normally precedes opening of a door, e.g. turning off the engine following parking, unlocking of the door, contact of a driver or passenger with a door handle, etc. Step 502 may include receiving the output of one or more interior sensors 116, such as a door sensor 118c.

Figure 5B:
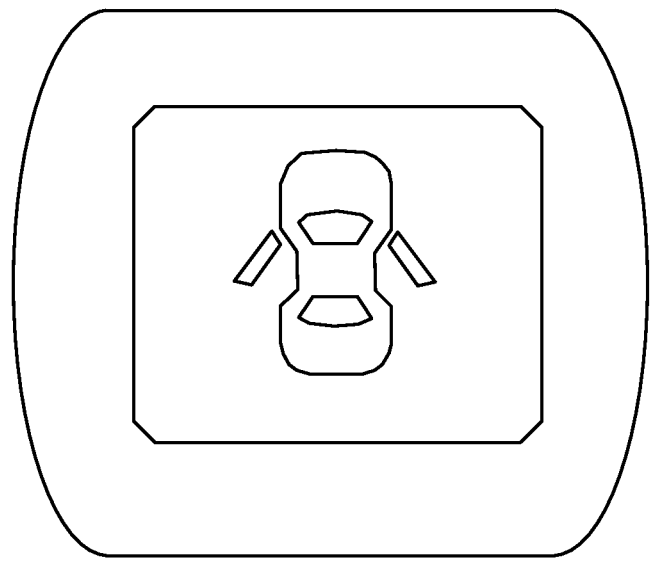
FIG. 5B illustrates a rear lamp communicating opening of a door in accordance with an embodiment of the present invention.

In response to the detection of step 502, the controller 102 may send 504 a door open warning to the lamp display module 120, which then renders 506 a door open warning on the rear lamp display 122. Alternatively, the controller 102 may invoke the rendering of step 506 directly. For example, as shown in FIG. 5B, a symbol showing a vehicle with its doors open may be displayed on the rear lamp display 122. In some embodiments, step 506 includes rendering an animation showing a door opening. In some embodiments, the door shown as open or opening may correspond to the door that is detected to be opening or about to open at step 502.

Figure 6A:
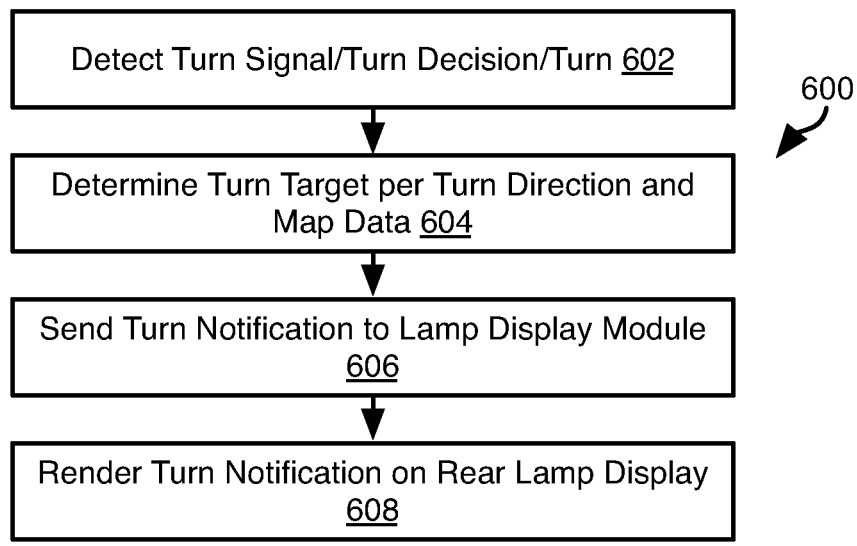
FIG. 6A is a process flow diagram of a method for communicating a turn using a rear lamp display in accordance with an embodiment of the present invention.

Referring to FIG. 6A, the controller 102 and lamp display module 120 may execute the illustrated method 600. The method 600 may include detecting 602 an impending turn. This may include detecting actual turning of the vehicle by one or more of detecting turning of the steering wheel or steering column, detecting change in road wheel angle, detecting a difference in the speed of road wheels on different sides of the vehicle, or detecting any other change in the steering system that is consistent with execution of a turn. Step 602 may include detecting a driver action indicating an intent to execute a turn, such as turning on a turn signal indicator. Step 602 may include detecting a turn in navigation data being used by a human driver or as the intended trajectory for an autonomous vehicle. For example, step 602 may include detecting that a turn will occur within the next N (e.g. 10) seconds based on the current location of the vehicle, the vehicle's speed, and the location of the turn in the navigation data, such as from a navigation application 106g executing on a mobile device. Step 602 may include detecting a decision by the control module 102 to execute a turn according to navigation or collision avoidance logic.

In response to detecting the turn, the method 600 may include performing some or all of steps 604-608. For example, step 604 may include determining 604 a target for the turn. Where the turn is detected based on navigation data, the target of the turn is the identifier of the road, business, address, or the like indicated in the navigation data. Where the turn is detected based on a driver action or a state of the steering system, the turn may be determined using map data and a current position of the vehicle determined using the GPS receiver 106f or as received from an application 106g executing on a mobile device. For example, where a left turn is detected based on a driver action (left turn signal activated or steering system state indicating a left turn), then a next road, exit, business, or other entity, located to the left of the vehicle may be determined to be the target. A right turn may be processed in an analogous manner.

Figure 6B:
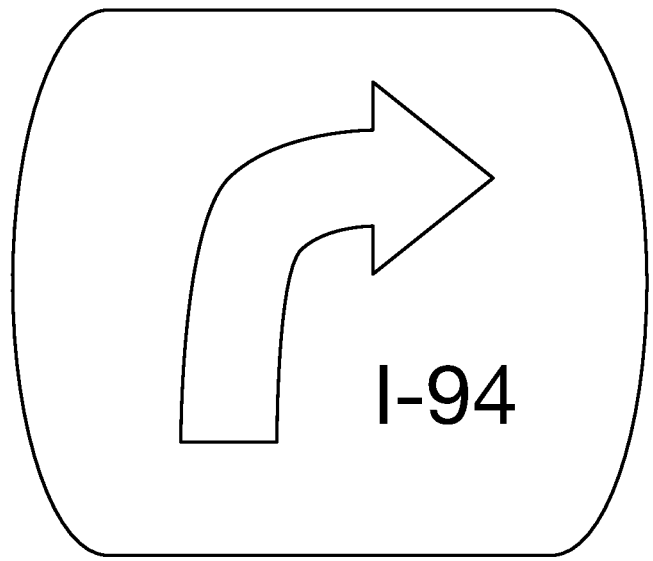
FIG. 6B illustrates a rear lamp communicating a turn in accordance with an embodiment of the present invention.

The method 600 may include transmitting 606 a notification to the lamp display module 120 that indicates both the direction of the turn and the target of the turn. The lamp display module 120 may the then cause the rear lamp display 124 to render 608 the direction and target. Where the functions of the lamp display module 120 are performed by the controller 102, step 606 is omitted and the controller 102 causes the rear lamp display 124 to display the direction and target. FIG. 6B illustrates an example output of the lamp display module that includes an arrow indicating a right turn and a target of the turn: "I-94."

Figure 7A:
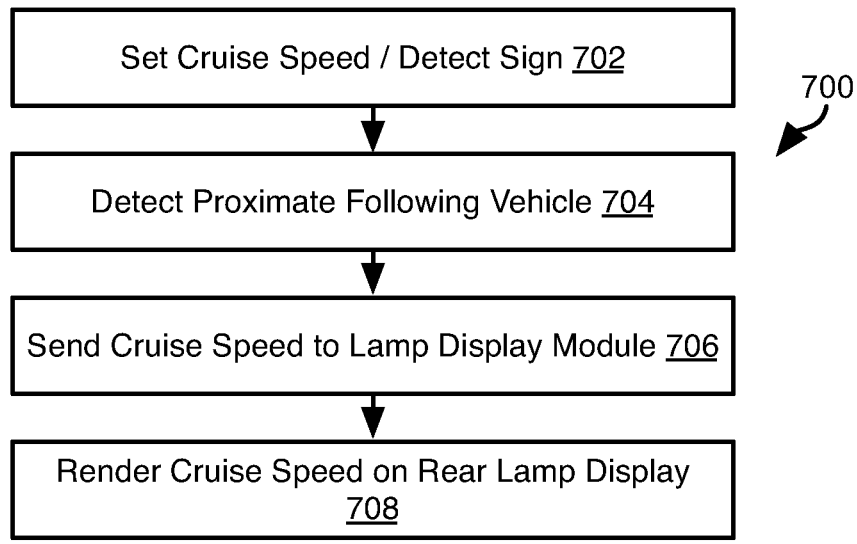
FIG. 7A is a process flow diagram of a method for communicating a vehicle speed using a rear lamp display in accordance with an embodiment of the present invention.

Referring to FIG. 7A, in some embodiments, the controller 102 and lamp display module 120 may perform the illustrated method 700. The method 700 may include one or both of setting 702 a cruising speed of the vehicle and detecting a sign indicating a posted speed limit for a road on which the vehicle is traveling. Step 702 may include receiving a set speed from the driver using a cruise control system or setting the speed by an autonomous vehicle based on outputs of the exterior sensors 104 and a known speed limit. Step 702 may include performing traffic sign recognition (TSR) in order to identify a sign including the posted speed limit.

The method 700 may include detecting 704 a following vehicle, such as a following vehicle within some distance, e.g. 50 feet or some other distance which may be a function of speed. For example, the distance within which a following vehicle is determined proximate may increase as a function of the speed of the vehicle 100. Detecting 704 a following vehicle may include detecting the following vehicle and its location using exterior sensors 104 using any detection technique known in the art.

Figure 7B:
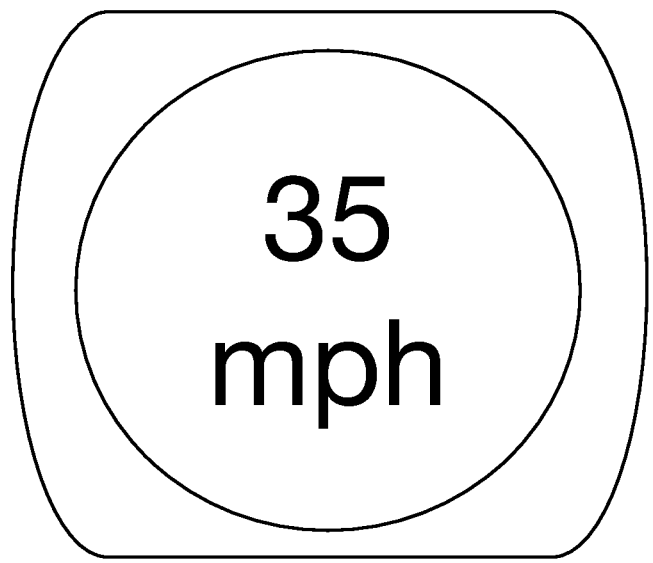
FIG. 7B illustrates a rear lamp communicating a vehicle speed in accordance with an embodiment of the present invention.

The method 70 may further include sending 706 the cruising speed to the lamp display module 120. Where step 702 includes detecting a speed limit sign, step 706 may include transmitting the speed limit as determined from the sign. The lamp display module 120 then causes the rear lamp display 122 to render 708 the speed received at step 706, as shown in FIG. 7B. Where the controller 102 implements the functionality of the lamp display module 120, step 706 may be omitted and the controller 102 may cause the rear lamp display 122 to render the cruising speed or speed limit.

In some implementations, the rear lamp display constantly displays the current speed of the vehicle 100 or the current speed limit regardless of whether there is a following vehicle, unless superseded by a need to display other information, such as according to FIGS. 3A to 6B.

In some embodiments, the cruising speed or speed limit is additionally or alternatively sent to the following vehicle in other ways. For example, the light emitted from the rear lamp display 122 may be modulated to communicate data, i.e. a binary code. The following vehicle may then detect and decode this modulation and display the data contained in it in a heads up display (HUD), infotainment display, an instrument cluster, or elsewhere. In other embodiments, the speed is transmitted to the following vehicle using a vehicle-to-vehicle (V2V) wireless communication protocol.

Figure 8A:
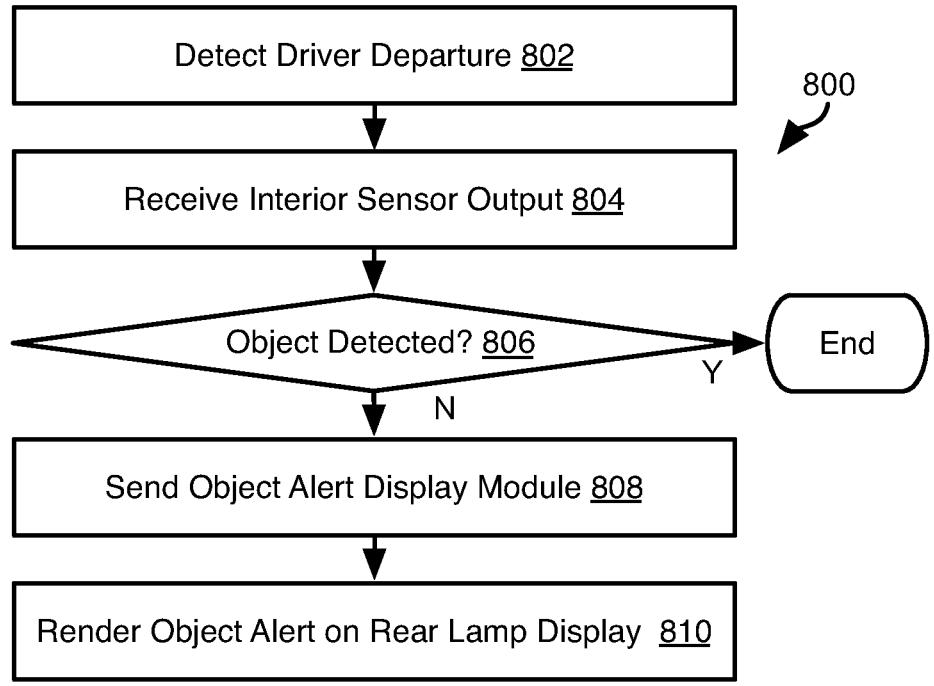
FIG. 8A is a process flow diagram of a method for communicating presence of an object using a rear lamp display in accordance with an embodiment of the present invention.

Referring to FIG. 8A, the controller 102 and lamp display module 120 may execute the illustrated method 800. The method 800 may include detecting 802 departure of the driver from the vehicle. Departure may be inferred from some or all of the driver turning of the vehicle's engine, the driver opening the driver's door, an electronic key fob being removed from within the vehicle, detecting an absence of weight on the driver's seat, optically detecting that the driver's seat is unoccupied, ultrasonically detecting that the driver's seat is unoccupied, detecting heat signature in the driver's seat that indicates absent of the driver, or any other means for detecting departure of a driver known in the art.

The method 800 may further include receiving 804 outputs of one or more interior sensors 116. This may include receiving outputs from interior cameras 118a, ultrasonic sensors 118b, RFID (radio frequency identifier) sensors, an output of a BLUETOOTH or other wireless receiver, or the like.

The method 800 may further include evaluating 806 whether the outputs of the interior sensors indicate presence of an object in the interior of the vehicle. In particular, step 806 may include evaluating whether the outputs of the interior sensors 116 indicate presence of an important object such as a cell phone, wallet, purse, or other item of value. For example, an output of a camera 118a may be processed to identify and classify objects in the output using any image analysis technique known in the art. Where the output is found 806 to include an image of an object classified as a wallet, cellphone, purse, or other object designated to be important enough to trigger an alert, then steps 808 and 810 may be executed.

For an RFID or BLUETOOTH receiver, step 806 may include detecting whether an RFID tag is detected or whether a device is still connected with the BLUETOOTH receiver, respectively.

Figure 8B:
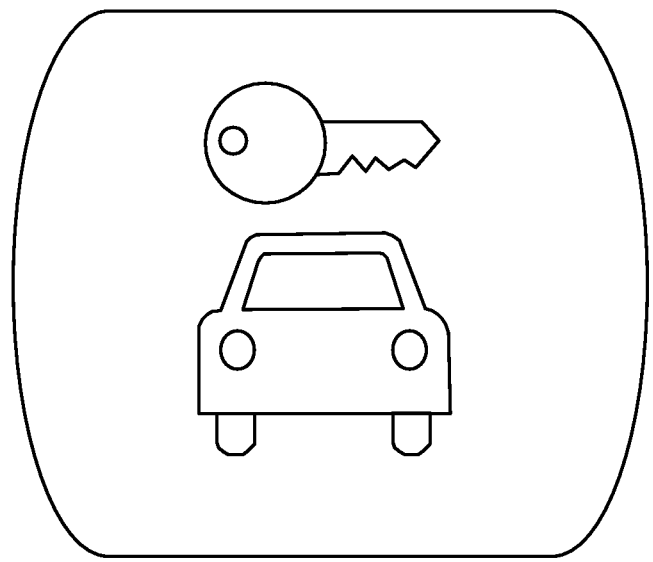
FIG. 8B illustrates a rear lamp communicating presence of an object in accordance with an embodiment of the present invention.

Step 808 may include sending an object alert to the lamp display module 120. The object alert may include a classification of the object identified at step 806 (cellphone, wallet, purse, etc.). In response, the lamp display module 120 causes the rear lamp display 122 to temporarily (e.g. for 20 seconds) render 810 a representation of the object in the rear lamp display 122. In embodiments where the controller 102 performs the function of the lamp display module 120, the controller 102 invokes performance of step 810 and step 808 may be omitted. As shown in FIG. 8B, in one example, where keys are left, the rear lamp display may be caused to temporarily display a rendering of a key and a vehicle as shown. In some embodiments, step 810 may be accompanied by one or more other perceptible alerts, such as an audible alarm, one or more flashing lights, or the like.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A vehicle comprising:
one or more sensors, wherein the one or more sensors includes at least one exterior sensor including at least one of a light detection and ranging (LIDAR) sensor and radio detection and ranging (RADAR) sensor;
a rearward facing lamp display; and
a controller coupled to the lamp display and the one or more sensors and programmed to:
detect an obstacle in one or more outputs of the at least one exterior sensor;
determine one or more obstacle vectors associated with the obstacle, the one or more obstacle vectors comprising one or more items of a classification of the obstacle, a location of the obstacle, and a direction of movement of the obstacle;
cause, based on the one or more obstacle vectors, the lamp display to display a symbol corresponding to the classification;
identify, based on the one or more outputs of the at least one exterior sensor, a posted speed limit for a road on which the vehicle is travelling;
set, based on the posted speed limit, a cruising speed of the vehicle;
determine, based on the one or more outputs of the at least one exterior sensor, that a following vehicle is proximate to the vehicle; and
cause, based on determining that the following vehicle is proximate to the vehicle, the lamp display to display the cruising speed of the vehicle.

2. The vehicle of claim 1, further comprising:
a steering actuator, a brake actuator; and an accelerator actuator all coupled to the controller;
wherein the controller is further programmed to activate one or more of the steering actuator, the brake actuator, and the accelerator actuator in response to detecting the obstacle in the one or more outputs effective to avoid collision with the obstacle by the vehicle.

3. The vehicle of claim 1, wherein the one or more sensors indicate a state of a door of the vehicle; and
wherein the controller is further programmed to display a symbol indicating a door opening in the lamp display in response to an output of the one or more sensors indicating opening of the door.

4. The vehicle of claim 1, wherein the one or more sensors include an interior sensor; and
wherein the controller is further programmed to display a symbol indicating presence of an object in the lamp display if an output of the interior sensor indicates presence of the object within the vehicle.

5. The vehicle of claim 1, wherein the one or more sensors detect at least one of turning of a steering column, a differential in tire speeds on right and left sides of the vehicle, activation of a turn signal, an autonomous decision to make a turn, an upcoming turn in navigation instructions; and
wherein the controller is further programmed to, in response to an output from the one or more sensors indicating the turn:
determine a target of the turn according to map data; and
display a direction of the turn and the target in the lamp display.

6. The vehicle of claim 1, wherein the one or more sensors are configured to detect stability and traction of the vehicle; and
wherein the controller is further programmed to:
if outputs of the one or more sensors indicate at least one of loss of traction and instability of the vehicle, performing an intervention, the intervention including least one of (a) redistributing engine torque among wheels of the vehicle, (b) modulating braking of the vehicle, (c) and decreasing engine torque; and
if outputs of the one or more sensors indicate the at least one of loss of traction and instability of the vehicle, cause the lamp display to display a warning of a hazardous road condition.

7. The vehicle of claim 1, wherein the lamp display comprises:
a light source; and
a digital micro-mirror device (DMD), the light source emitting a light onto the DMD;
wherein the controller is coupled to the DMD.

8. The vehicle of claim 7, wherein the lamp display further comprises a heat sink and an output window; and
wherein the controller is programmed to cause the DMD to direct a first portion of the light onto the heat sink and a second portion of the light onto the output window effective to form an image on the output window.

9. A method comprising:
providing a vehicle having one or more sensors, a rearward facing lamp display, and a controller coupled to the lamp display and the one or more sensors, wherein the one or more sensors includes at least one exterior sensor including at least one of a light detection and ranging (LIDAR) sensor and radio detection and ranging (RADAR) sensor;
receiving, by the controller, one or more outputs from the one or more sensors;
detecting, by the controller, an obstacle in the one or more outputs;
determining, by the controller, one or more obstacle vectors associated with the obstacle, the one or more obstacle vectors comprising one or more items of a classification of the obstacle, a location of the obstacle, and a direction of movement of the obstacle;
causing, based on the one or more obstacle vectors, the lamp display to display a symbol corresponding to the classification;
identifying, by the controller, based on the one or more outputs of the at least one exterior sensor, a posted speed limit for a road on which the vehicle is travelling;
setting, based on the posted speed limit, a cruising speed of the vehicle;
determining, by the controller, based on the one or more outputs of the at least one exterior sensor, that a following vehicle is proximate to the vehicle; and
in response to determining that the following vehicle is proximate to the vehicle, causing, by the controller, the lamp display to display the cruising speed of the vehicle.

10. The method of claim 9, wherein the vehicle further comprises a steering actuator, a brake actuator; and an accelerator actuator all coupled to the controller;
wherein the method further comprises activating, by the controller, one or more of the steering actuator, the brake actuator, and the accelerator actuator in response to detecting the obstacle in the one or more outputs effective to avoid collision with the obstacle by the vehicle.

11. The method of claim 9, wherein the one or more sensors detect a state of a door of the vehicle; and wherein the method further comprises displaying, by the controller, a symbol indicating a door opening in the lamp display in response to an output of the one or more sensors indicating opening of the door.

12. The method of claim 9, wherein the one or more sensors include an interior sensor; and wherein the method further comprises displaying, by the controller, a symbol indicating presence of an object in the lamp display if an output of the interior sensor indicates the presence of the object within the vehicle.

13. The method of claim 9, wherein the one or more sensors detect at least one of turning of a steering column, a differential in tire speeds on right and left sides of the vehicle, activation of a turn signal, an autonomous decision to make a turn, an upcoming turn in navigation instructions; and wherein the method further comprises, in response to an output from the one or more sensors indicating the turn:
determining, by the controller, a target of the turn according to map data; and
displaying, by the controller, a direction of the turn and the target in the lamp display.

14. The method of claim 9, wherein the one or more sensors are configured to detect stability and traction of the vehicle; and wherein the method further comprises:
in response to outputs of the one or more sensors indicating at least one of loss of traction and instability of the vehicle, performing, by the controller an intervention, the intervention including least one of (a) redistributing engine torque among wheels of the vehicle, (b) modulating braking of the vehicle, (c) and decreasing engine torque; and
in response to the outputs of the one or more sensors indicating the at least one of loss of traction and instability of the vehicle, causing, by the controller, the lamp display to display a warning of a hazardous road condition.

15. The method of claim 9, wherein the lamp display comprises:
a light source; and
a digital micro-mirror device (DMD), the light source emitting a light onto the DMD;
wherein the controller is coupled to the DMD.

16. The method of claim 15, wherein the lamp display further comprises a heat sink and an output window; and wherein the method further comprises causing, by the controller, the DMD to direct a first portion of the light onto the heat sink and a second portion of the light onto the output window effective to form an image on the output window.

* * * * *